June 2, 1925.
W. W. BLAKELY
1,539,931
ANCHORAGE DEVICE FOR VEHICLES
Filed May 12, 1924
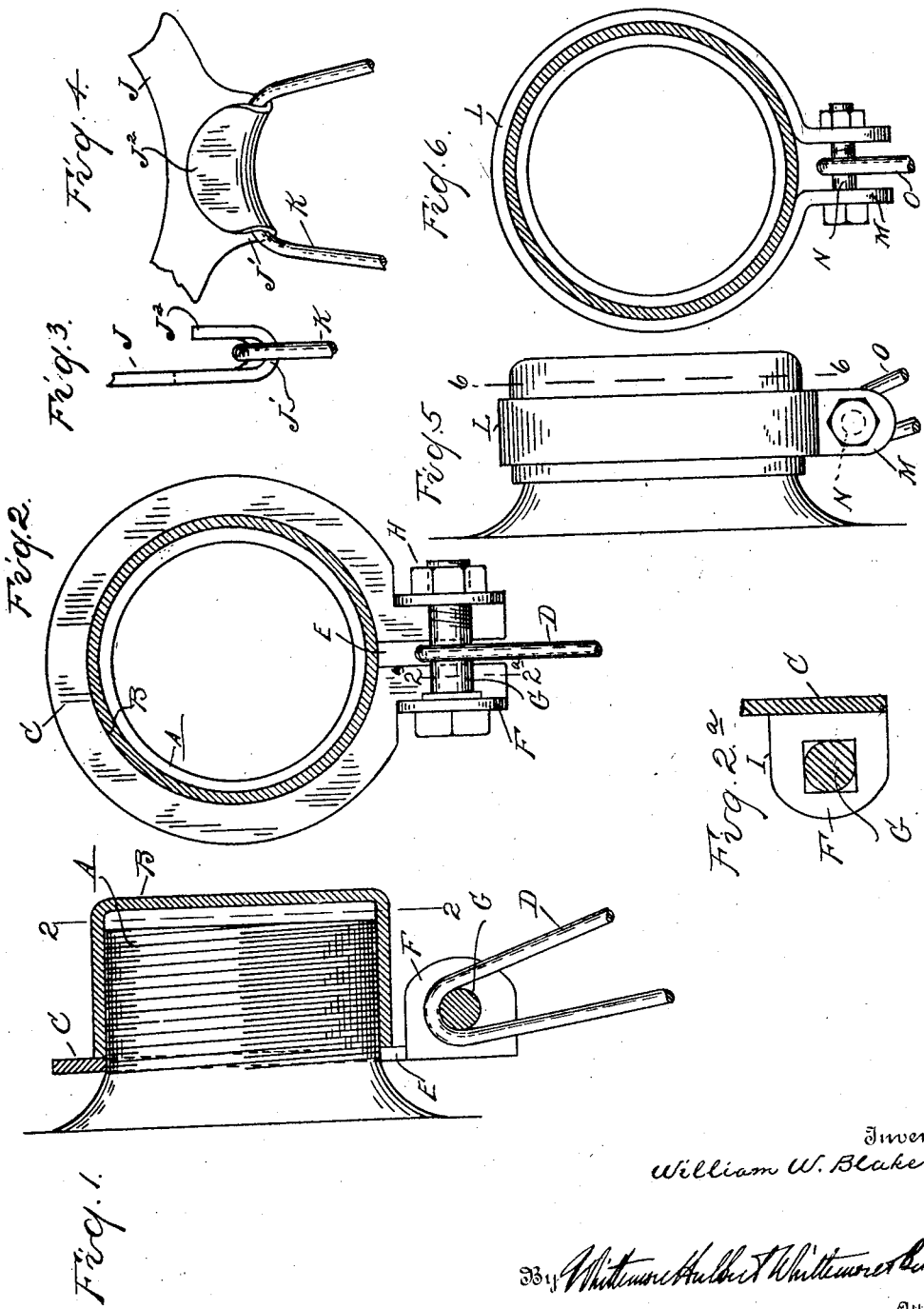
Inventor
William W. Blakely Patented June 2, 1925.

1,539,931

UNITED STATES PATENT OFFICE.

WILLIAM W. BLAKELY, OF DETROIT, MICHIGAN.

ANCHORAGE DEVICE FOR VEHICLES.

Application filed May 12, 1924. Serial No. 712,726.

*To all whom it may concern:*

Be it known that I, WILLIAM W. BLAKELY, a citizen of the United States of America, residing at Detroit, in the county of Wayne and State of Michigan, have invented certain new and useful Improvements in Anchorage Devices for Vehicles, of which the following is a specification, reference being had therein to the accompanying drawings.

This invention relates to anchorage devices for vehicles such as are employed to hold a vehicle stationary within a freight car or other carrier.

The invention consists in the structural features and arrangement of parts hereinafter set forth.

In the drawings:—

Figure 1 is a view in side elevation of a vehicle wheel hub with which is engaged one form of the invention, the hub cap being shown in section;

Figure 2 is a sectional view taken on the line 2—2 of Figure 1.

Fig. 2$^A$ is a section on 2$^A$—2$^A$ of Figure 2.

Figures 3 and 4 are views similar to 1 and 2 but of a fragmentary nature and showing a modified means for connecting the tie member of the invention to the ring which engages the hub of the wheel.

Figure 5 is a similar view showing still another modification.

Figure 6 is a sectional view taken on the line 6—6 of Figure 5.

Referring first to the construction shown in Figures 1 and 2, A designates the hub of a vehicle wheel, said hub being exteriorly threaded as is common practice for engagement by the screw cap B. C is a stamped sheet metal ring which is interiorly threaded to screw upon the hub A and which is adapted to be retained upon said hub by the cap B. D is an arched tie member formed preferably of heavy wire which is engaged with the ring C beneath the hub and extends downwardly to be fastened to the surface supporting the vehicle wheel. To permit the ring C to be more quickly placed upon and removed from the hub A said ring is preferably split as indicated at E and its opening is slightly oversize so that normally the ring will clear the threads of the hub and may be slid immediately to or from its desired position upon the hub without rotational movement. At each side of the split E in the ring, lugs F are struck out transverse to the ring and are apertured for engagement by a clamping bolt G. By tightening the nut H upon said bolt the split ends may be drawn together causing the threads of the ring to mesh with those of the hub. The bolt G further forms a means for connecting to the ring the arched tie member D, the latter seating at its bend upon said bolt and having its legs downwardly extended at a slight divergence in the vertical axial plane of the hub. Preferably the bolt G is provided with the square shoulder I adjacent its head and the aperture in the lug F engaged by said head is of a corresponding shape to receive said shoulder whereby the bolt is restrained from rotation.

In that form of the invention illustrated in Figures 3 and 4 there is again shown a stamped sheet metal ring J for engaging the hub of the vehicle wheel but in this construction there is formed a downward projection J' upon the ring, which projection is hooked upwardly as indicated at J$^2$ for engagement by the arched tie wire K.

In the construction shown in Figures 5 and 6 there is employed a split cylindrical ring L having its split end portions bent downwardly in spaced relation as indicated at M and apertured for engagement by a clamping bolt N which further forms a seat for the bent upper end of an arched tie wire O and extending between the down-turned portions M of the ring L.

It is a characteristic of each of the described constructions that the stamped sheet metal ring is mounted upon the hub and arched tie member formed preferably of wire is engaged with said ring. Such constructions may be produced at a low manufacturing cost and can be quickly applied or removed.

What I claim as my invention is:—

1. An anchorage device for vehicles comprising a split ring engageable with a vehicle part, and a tie member attached to said ring, a cap retaining the ring on said vehicle part, a clamping member engaging the split ends of said ring for drawing the same together.

2. An anchorage device for vehicles comprising a split ring adapted to fit over a vehicle part, a clamping connection between the split ends of said ring for drawing the latter together upon said part, and an arched tie member, the bend of which is seated upon said clamping connection.

3. In an anchorage device for vehicles, a stamped sheet metal ring proportioned to fit over a vehicle part and formed with a pair of lugs integrally projecting at right angles to said ring, a connection between said lugs, and an arched tie member having the bend thereof engaging between said lugs and seated upon said connection.

4. The combination with a wheel hub, of a ring sleeved upon said hub having spaced lugs, a cap detachably secured to said hub holding said ring thereon, a connection between said lugs, and an anchorage member carried by said connection.

In testimony whereof I affix my signature.

WILLIAM W. BLAKELY.